April 25, 1933.  G. INNES  1,905,410
HARVESTING MACHINE
Filed Dec. 19, 1929   3 Sheets-Sheet 1
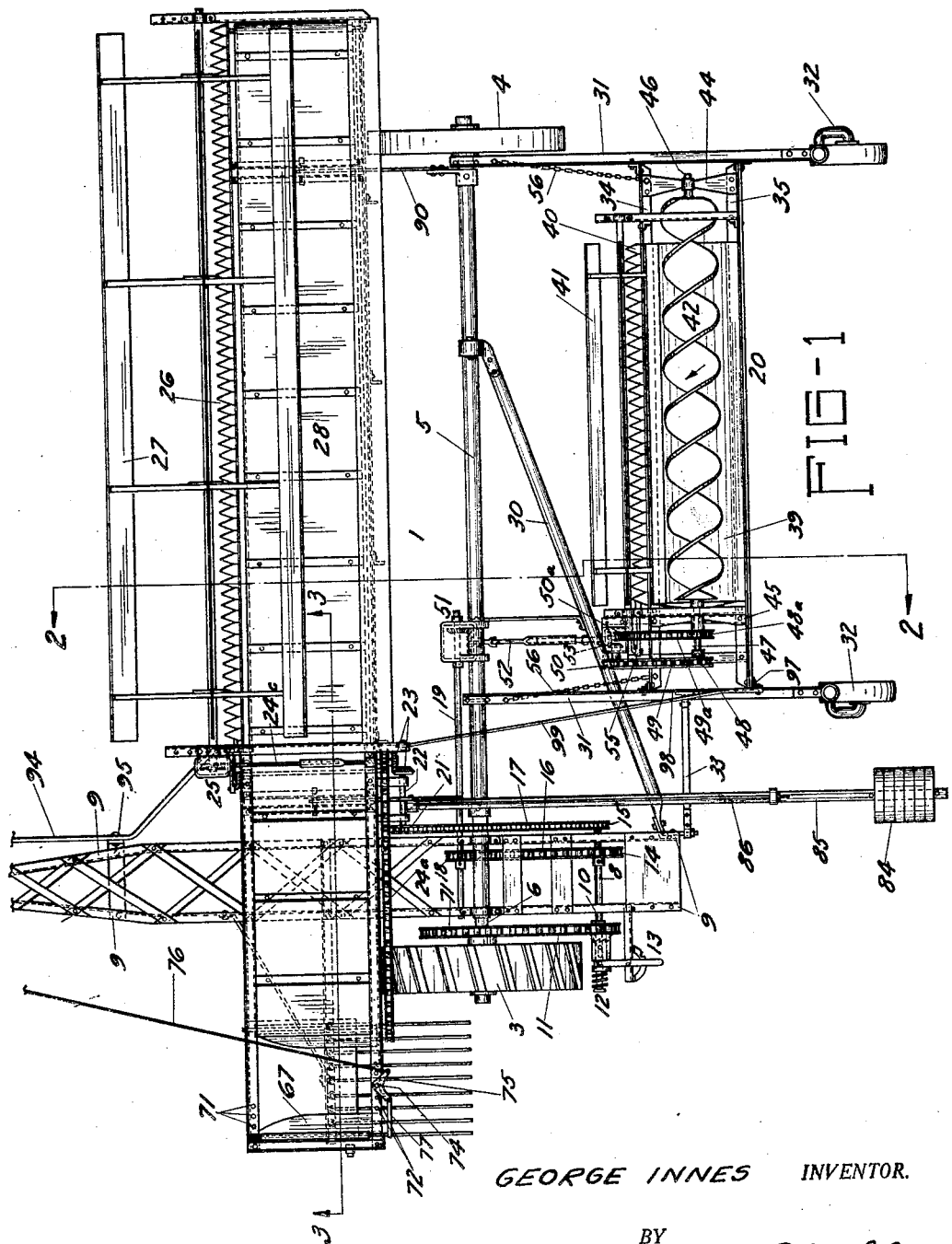
GEORGE INNES  INVENTOR.
BY
Merrill M. Blackburn
ATTORNEY

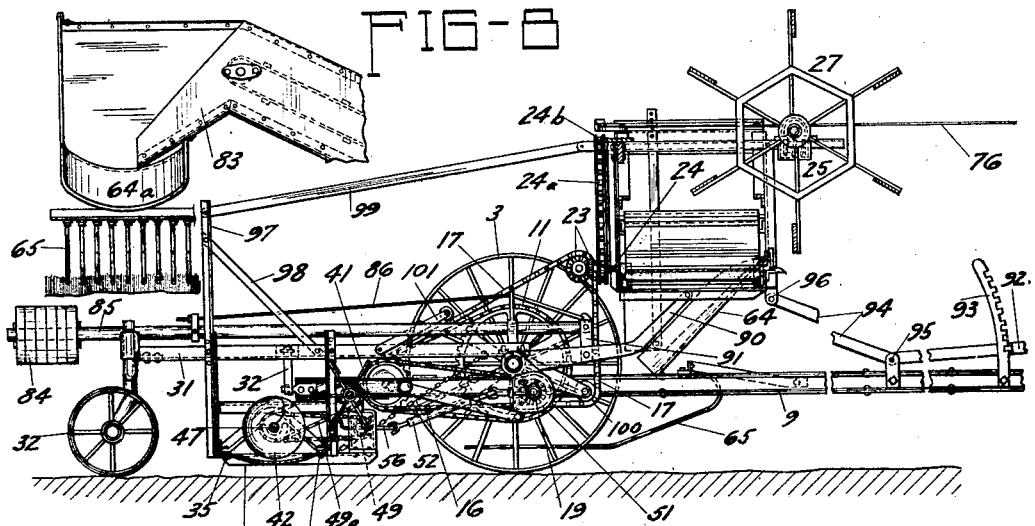
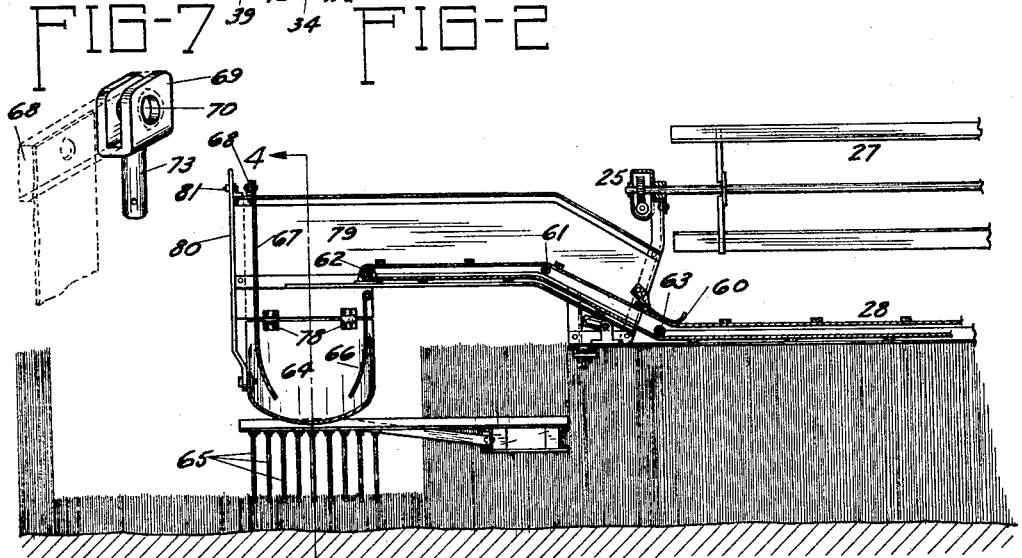
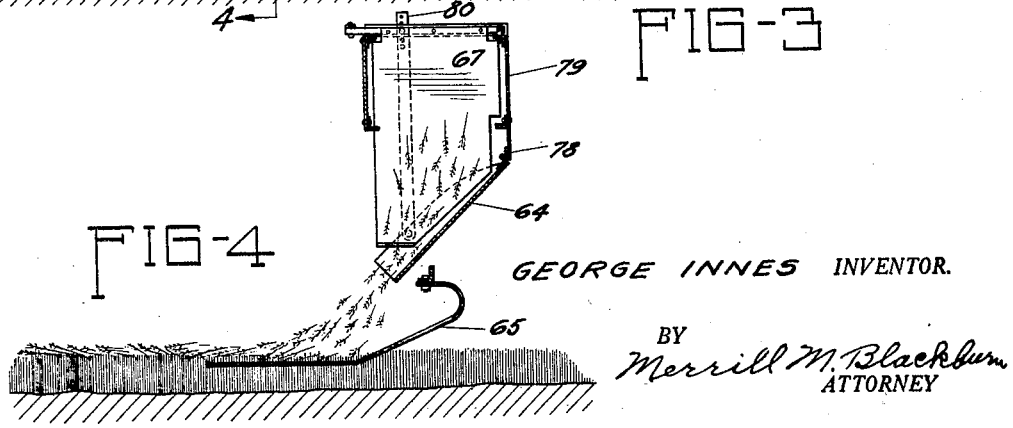

April 25, 1933.  G. INNES  1,905,410
HARVESTING MACHINE
Filed Dec. 19, 1929   3 Sheets-Sheet 3
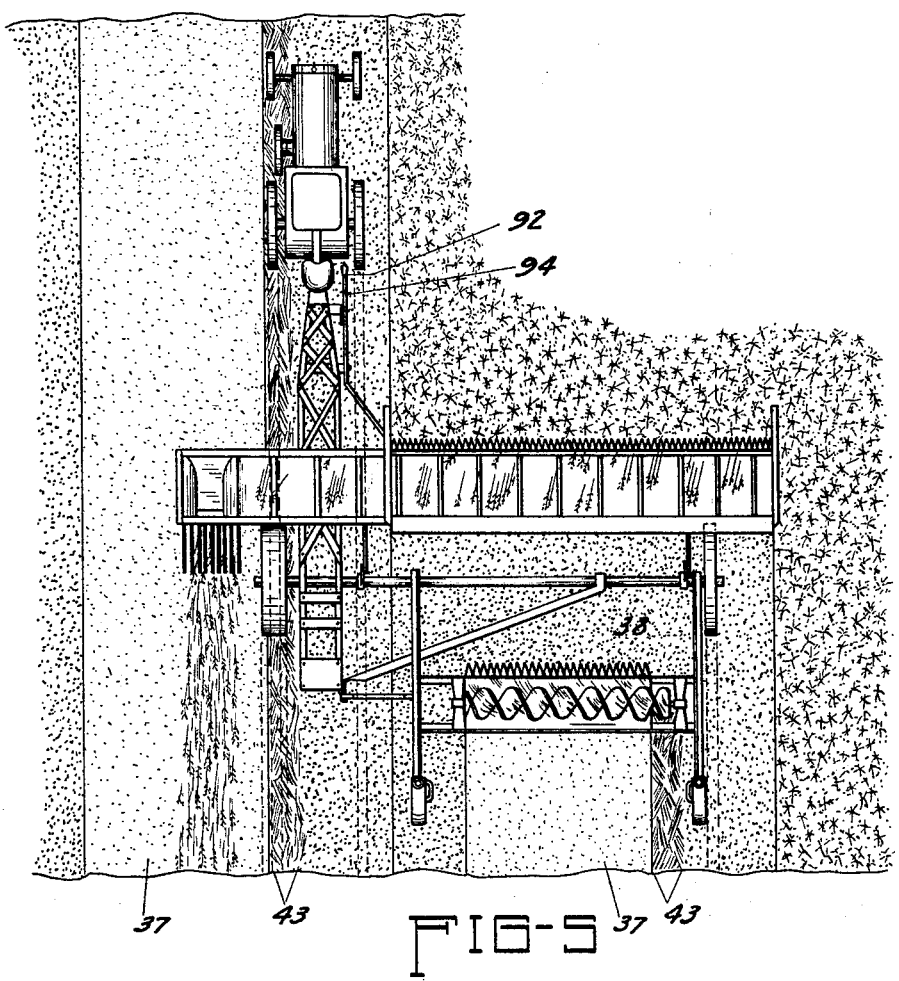
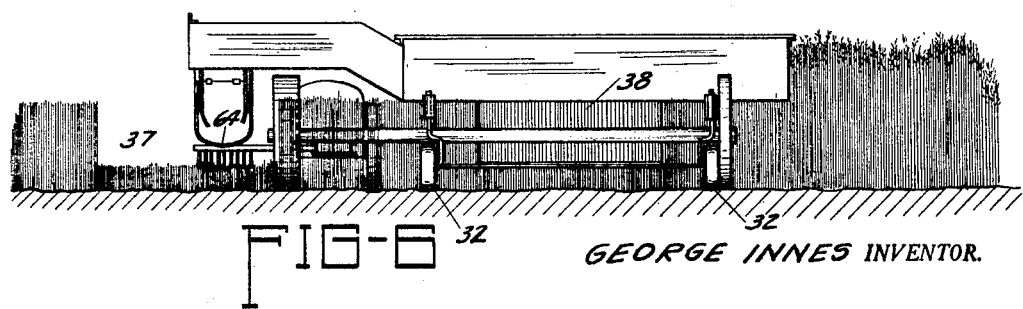
GEORGE INNES INVENTOR.
BY
Merrill M. Blackburn
ATTORNEY Patented Apr. 25, 1933

1,905,410

UNITED STATES PATENT OFFICE

GEORGE INNES, OF DAVENPORT, IOWA, ASSIGNOR TO INNES MANUFACTURING COMPANY, OF BETTENDORF, IOWA, A CORPORATION OF DELAWARE

HARVESTING MACHINE

Application filed December 19, 1929. Serial No. 415,319.

The present invention relates to an apparatus for harvesting grain and more particularly to an apparatus for cutting off the heads of the grain and delivering the same in windrows for curing prior to the threshing operation. This application is in part a continuation of my prior application Serial No. 341,393 filed February 19, 1929, in which application division has been required between method and apparatus claims.

The method of harvesting with a combined harvester and thresher in which the heads of grain are delivered directly from a header to a threshing machine traveling therewith is far from satisfactory for the reason that in most cases a considerable proportion of the heads of grain will not be properly cured and the threshed grain is consequently of inferior quality. Furthermore, when the kernels of grain are not properly cured, it is difficult to avoid spoilage of the grain by heating and molding when stored in bulk.

It has been proposed to deposit the heads from the heading machine in windrows across the field and after the grain has had time to cure, to thresh the grain in a threshing machine which travels along the windrows gathering and threshing the heads of grain. This method, however, except in fields in which the straw is short offers serious difficulties.

If the stalks of straw are cut near the heads or at half their length, the stubble is then so flexible that it collapses allowing the windrow to come close to the ground, whereas the stubble should remain erect, and thus provide a ventilating space beneath.

If, in order to provide a stiff stubble, the stalks of straw are cut close to the ground, then the volume of heads and straw make so thick a windrow as to prevent proper curing. Also this excessive bulk prevents proper threshing as the threshing unit of the combined harvester-thresher is designed for heads only. Also, the greater weight of the bulk of heads and straw causes even the short stubble to be pressed down and thus prevent ventilation from beneath and the moisture from the earth passes up into the windrow and causes the windrow to become more damp then when made. This causes the grain to deteriorate and sometimes mold.

Among the objects of this invention are to provide a machine which will so position the windrow that the harvesting machine and tractor or draft animals pulling the machine may make the turns and the corners of the field without disturbing previously formed windrows; to provide a machine which has a main cutter unit which cuts off the heads of the grain and delivers them laterally from the machine into a windrow and a secondary cutter which cuts a swath in the standing straw left by the main cutter and clears a pathway of stubble to receive a windrow of grain heads from the machine; to provide a machine in which both the main and auxiliary cutter units are vertically adjustable to cut off the heads and the standing straw at the proper heights from the ground to obtain heads of the designed length and stubble of the proper length to receive and support the windrows of heads; to provide improved means for laying the grain heads in windrows upon the stubble so that the grain, when cured, will be in the best possible position for the pickup mechanism to pick it up; to provide improved means for disposing of the surplus straw cut by the secondary cutter and laying the same in windrows where it will not interfere with the windrows of heads and the gathering thereof; to provide an improved mechanism for handling the grain heads such that the tendency thereof will be to straighten out these heads and laying them substantially parallel on the stubble and lying substantially parallel with the course of travel of the machine; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof, Fig. 1 is a plan view of a machine embodying the present invention; Fig. 2 is a vertical section substantially along the plane indicated by the line 2—2, Fig. 1; Fig. 3 is a vertical section substantially along the plane indicated by the line 3—3, Fig. 1; Fig. 4 is a vertical section through the mechanism for laying down the windrow, taken substantially along the plane indicated by the line 4—4, Fig. 3; Fig. 5 is a somewhat diagrammatic view of the machine and a portion of a field, the same being designed to show the relationships of the swaths and windrows; Fig. 6 is a rear end view of the disclosure of Fig. 5; Fig. 7 is a perspective view of a detail of construction; Fig. 8 shows a modified form of the means for laying down the windrow.

Reference will now be made in more detail to the accompanying drawings wherein the harvesting machine is designated by the numeral 1 and the power unit for drawing the same by the numeral 2. The bull wheel is denoted by the numeral 3 and the grain wheel by the numeral 4, while these two wheels are shown as being connected by a shaft 5 which carries the major portion of the weight of the machine. The shaft 5 is suitably secured to the frame of the machine so that it does not revolve but does rock to permit the lowering and raising of the cutting platform. A stubshaft 6 is fitted within the end of shaft 5 adjacent the bull wheel 3 and forms an extension of the shaft 5. On this shaft 6 is mounted the bull wheel which has a sprocket 7 rigidly connected thereto to furnish power for the driving of the harvesting mechanism. A shaft 8 is mounted in connection with the frame elements 9 of the machine and has a sprocket 10 loosely mounted thereon for rotation relative thereto. The sprocket chain 11 connects the sprockets 7 and 10, as will be obvious from Fig. 1. Any suitable clutch mechanism 12 and disengaging means 13 are provided for clutching the sprocket 10 to the shaft 8 or disengaging the same therefrom. It will therefore be seen that when the machine is traveling forwardly the bull wheel will cause the driving of the sprockets 7 and 10 and the shaft 8, if the clutching mechanism 12 is engaged.

Other sprockets 14 and 15 are carried by the shaft 8 and have chains 16 and 17 passing thereover to transmit power to elements to be driven thereby. A sprocket 18 is mounted on shaft 19 and is driven by the chain 16. Power is thus transmitted from the bull wheel to the shaft 19 and from this to the secondary cutting mechanism 20 which will be described hereinafter.

Chain 17 passes over a sprocket 21 mounted on a shaft 22 and power is thus transmitted from the bull wheel to and through the shaft 22, bevel gears 23 and shaft 24 to the primary cutting means. A sprocket chain 24a passes over a sprocket on shaft 24 and over a sprocket 24b on shaft 24c. Suitable power transmitting means is indicated at 25 from which power is transmitted to the sickle 26 and reel 27 in the customary manner. This means 25 is actuated by the shaft 24c. The grain heads severed by the sickle 26 are pushed over by the reel 27 to the apron 28 by which they are carried laterally to be deposited in a windrow by my new windrowing mechanism.

The secondary cutting mechanism 20 will now be described, as this provides the swath or pathway of stubble upon which the heads are to be deposited. A brace 30 connects one of the frame elements 9 with the shaft 5 and serves to render the structure rigid. A pair of secondary frame elements 31 are also attached to the shaft 5 and are supported at their rear ends by the castor wheels 32. For bracing purposes, a brace member 33 connects the frame elements 9 and 31, thus insuring that the entire frame will swing together. Front and rear frame elements 34 and 35 connect the elements 31 and complete the frame of the secondary cutting mechanism. As is indicated in Fig. 6, this secondary cutting mechanism cuts at a considerably lower elevation than the primary cutter. At the right of this figure the grain is shown as standing at its full height while, through a major portion of the figure, the grain is shown as having had its heads removed. At 37 is shown a swath from which the secondary cutting mechanism has cut the bulk of the straw, leaving comparatively short stubble upon which the grain heads are to be deposited. At 38 is indicated that part of the headless straw which is being cut off by the secondary cutter.

A concave metal plate 39 is mounted on the frame members 34 and 35 as shown most clearly in Figs. 1 and 2 and receives the straw cut by the sickle 40 and pushed rearwardly by the reel 41. An auger 42 pushes this straw longitudinally of the plate 39 so that it is deposited in a windrow as indicated at 43 in Fig. 5. Supporting means 44 and 45 are provided in connection with the secondary frame for the support of the auger 42 which is provided at its ends with shafts 46 and 47 about which it may be rotated. The shaft 47 carries a sprocket 48 which is driven by a chain 49 from a sprocket 50. This latter is driven from the shaft 19 through a gearing 51, shaft 52 and gearing 53. Power is also taken from the shaft 47 to drive the reel 41 as will be understood from Fig. 1, the power being transmitted through a sprocket 48a, chain 49a and sprocket 50a. An eccentric and pitman 55 are also provided for driving the secondary sickle, in accordance with common practice. Chains 56 help to make the structure rigid so that there will be no working loose of the secondary cutting mechanism from the primary mechanism.

Referring now to sheet 2 of the drawings, the mechanism for forming the windrows of grain heads will be described. An apron 28, referred to above, passes under guides 60 at the front and rear sides of the platform, above the roller 61 around roller 62 and then under a roller 63. Therefore, as this apron is driven forward by the operation of the machine the grain will be carried along and dropped on the plate 64 from which it slides to the fingers 65 which travel just below the top of the stubble left by the secondary cutter and indicated by the numeral 37 in Fig. 5. A windrow is thus formed of the grain heads resting on top of the short stubble and practically none of the grain goes down to rest on the ground. In view of this positioning of the grain as illustrated in Fig. 4, there is plenty of room below the same for passage of air so that the grain will become thoroughly dried and cured. A sheet of metal 66 is suspended inside of what might be called a hopper formed by the curved sheet 64 and assists in getting the grain heads in proper position. On the opposite side of this hopper is another curved sheet which is adjustably supported above and against which considerable of the grain delivered by the apron 28 strikes before reaching the plate 64. This shield 67 therefore has a tendency to straighten out the grain and cause it to drop into positions substantially parallel with the course of travel of the machine. As illustrated in Fig. 3, this shield is suspended from a bar 68, one end of which is pivotally mounted in a member 69 shown in Fig. 7. The pivot, passing through the opening 70, permits this plate 68 to have a vertical swinging motion but does not permit it to rotate about its axis. Therefore, the shield 67 will not be permitted to swing. This shield not only serves to stop the grain and prevent it from going over and outside of the chute 64 but also serves as a windshield to prevent wind from blowing the grain out of its intended course.

Series of openings 71 and 72 are provided in the frame, the former for reception of the shank 73 of member 69 and the latter for the reception of the pivot 74 of the bellcrank lever 75. This latter is actuated by means of a rod 76 reaching to the vicinity of the seat of the tractor. This enables the operator of the machine to actuate the bell crank lever and, since this is connected by the link 77 with the bar 68, he may thus swing the shield 67 about the axis of the shank 73, thus changing the direction of the shield so that the grain heads may be guided thereby into proper positions. As shown at 78, the plate 64 is hinged to the forward wall 79 of the grain conveyor casing and the inclination of this plate 64 may thus be changed by raising or lowering the link 80. While this may be made to be adjusted from the tractor seat, I do not consider this necessary and have therefore shown the same as adjustably secured in position by means of the nut and bolt 81.

An alternative form of the windrow laying mechanism is shown in Fig. 8. As a matter of fact, I believe this form of construction to be preferable to that shown in Fig. 3. In this construction the apron 28 is straight between the rollers 62 and 63 and the roller 61 is therefore unnecessary. Instead of the grain dropping free from the apron 28 to the plate 64, it drops to an inclined chute 83 from which it slides to the plate 64a. While this plate may be adjustable as in the case of the plate 64, it is not believed that this is necessary as the same will ordinarily have sufficient inclination to assure that the grain will slide from same to the fingers 65. Also, the baffle plate 67 is done away with in this construction as it is believed that the provision of the chute 83 will insure that the grain will fall into the chute 64a in substantially parallel positions and thus be delivered to the fingers 65 in parallelism with the course of travel of the machine. It will thus be seen that this form of construction is much simpler than that shown in Fig. 3 and it is believed that the results attained thereby will be equal to those attained with the more complex structure.

The weight 84 on the beam 85 performs the same function as the weight 47 on beams 46 of my application identified above and of which this is in part a continuation. A brace rod 86 helps to support the beam 85 and prevents the same from bending under the influence of the weight 84 which is used to balance the surplus weight of the machine in front of the main axle. This therefore gives the machine a proper balance, fore and aft.

It is of course desirable to be able to raise and lower the main cutting unit to take care of particularly tall grain and grain that has become lodged or is especially short. In order to accomplish this, the main cutting unit is pivotally connected to arms 90 which are secured to the axle 5. As indicated in Fig. 2, the beam 85 is secured in any suitable manner to the arm 90, as indicated at 91. Therefore, the cutting unit is balanced with relation to the axle 5 by the beam 85 and weight 84. Therefore, this cutting unit can be easily raised or lowered by manipulating the handle 92. A locking pawl in connection with this handle cooperates with a locking rack 93 on one of the frame elements 9 and thus holds the lever 94 in adjusted position. As indicated in Fig. 2, this lever is pivoted at 95 and is pivotally connected at 96 to the main cutting unit. Therefore, raising or lowering of the handle 92 has the opposite effect upon the cutting unit. The present drawings show a machine which is adapted to cut either excessively high grain or grain which has become lodged. That is, it shows a machine having capability for extreme adjustment from high to low and vice versa.

If it is not desired to have such extreme adjustment, the cutting unit may be mounted at a lower elevation by means of brackets secured to the frame of the machine and supporting the rear edge of this unit at a fixed distance above the frame members 9. The front edge of this unit will then be raised and lowered by means of the lever 94 and the platform will tilt backwardly in the highest positions and forwardly in the lower positions.

In the construction illustrated, the post 97 is extended upwardly some distance above the secondary cutting unit and is braced by means of a brace 98. Pivotally connected to the upper end of this post is a link 99 which also has pivotal connection with the upper portion of the primary cutting unit. These parts are so constructed and arranged that the platform remains substantially level throughout its entire range of travel. However, if it be desired to have the platform tilt forwardly or backwardly, this can be accomplished by a proper vertical adjustment of the rear end of the bar 99. In order to permit the slight forward movement of the primary cutting unit when moving downwardly from the position illustrated in Fig. 2, it is desirable to have a short slot in the lever through which the pivot forming the connection 96 may slide. It will be seen from Fig. 2 that the upper part of sprocket chain 17 passes over sprocket 21 thence downwardly around pulley 100 and backwardly around the sprocket 15. Therefore, as the main cutter unit moves upwardly or downwardly during vertical adjustment thereof to cut the grain at different heights from the ground, there will be a tightening or slackening of the chain 17. In order to compensate for this, a pulley carried by arm 101 presses against chain 17 to keep the same tight at all times regardless of the position of the main cutter unit. Of course it will be understood that this chain must be long enough to reach the maximum distance which will be required of it during any position of adjustment of the main cutting unit, and the take-up device must be constructed and arranged to take up any slack in the chain in any position of adjustment. I wish it distinctly understood that I do not consider it at all necessary in the majority of cases to make provision for the extreme movement illustrated in Fig. 2, it being sufficient in most cases to construct the machine as suggested above with a connection to a frame element 9 and without the part 97, 98 and 99.

From the foregoing description, taken in connection with the annexed drawings, it will be seen that I have provided a machine which will accomplish the objects set forth above.

It is intended to claim both broadly and specifically the various novel subject matter disclosed herein and it is therefore desired that failure to insert claims commensurate with the scope of this invention be not construed as a disclaimer of such subject matter.

It is of course understood that the specific description of structure set forth above may be departed from without departing from the spirit of my invention as set forth in this specification and the appended claims.

Having now described my invention, I claim:

1. A harvesting machine comprising a main cutter for severing the stalks of grain adjacent the heads thereof, an auxiliary cutter for cutting straw left standing by the main cutter, and means for collecting the heads of grain and discharging the same in windrows on stubble left standing by the auxiliary cutter.

2. A harvesting machine comprising a main cutter for severing the stalks of grain adjacent the heads thereof, an auxiliary cutter for cutting straw left standing by the main cutter, and means for delivering the heads of grain cut by the main cutter and the straw cut by the auxiliary cutter in parallel windrows.

3. A harvesting machine comprising a main cutter for severing the stalks of grain adjacent the heads thereof, an auxiliary cutter of less length than the main cutter and operating at a lower level to cut swaths through the straw left standing by the main cutter, means associated with the auxiliary cutter for moving the cut straw laterally to leave a pathway of stubble, and means associated with the main cutter for delivering the heads in a windrow along a pathway of stubble left by the auxiliary cutter.

4. A harvesting machine comprising a main cutter for severing the stalks of grain adjacent the heads thereof, an auxiliary cutter for cutting straw left standing by the main cutter, means for collecting the heads of grain and discharging the same in windrows on stubble left standing by the auxiliary cutter, and means for relatively adjusting the main and auxiliary cutters vertically.

5. A harvesting machine comprising a main cutter for severing the stalks of grain adjacent the heads thereof, an auxiliary cutter of less length than the main cutter and operating at a lower level to cut swaths through the straw left standing by the main cutter, means associated with the auxiliary cutter for moving the cut straw laterally to leave a pathway of stubble, means associated with the main cutter for delivering the heads in a windrow along a pathway of stubble left by the auxiliary cutter, and means for adjusting the main cutter vertically.

6. A harvesting machine comprising a main cutter for severing the stalks of grain adjacent the heads thereof, an auxiliary cutter of less length than the main cutter and operating at a lower level to cut swaths through the straw left standing by the main cutter, and means associated with said cutters for delivering the heads of grain cut by the main cutter and the straw cut by the auxiliary cutter in parallel windrows, the former on the stubble left standing by the auxiliary cutter.

7. A harvesting machine comprising a main cutter for severing the stalks of grain adjacent the heads thereof, an auxiliary cutter of less length than the main cutter behind and below the main cutter, a conveyor associated with the main cutter mounted to receive heads of grain cut by the main cutter and having its delivery end beyond the outer end of said main cutter, and a conveyor associated with the auxiliary cutter mounted to receive straw cut by the auxiliary cutter, the latter conveyor being of greater length than the auxiliary cutter.

8. A harvesting machine having a header and an auxiliary cutter for cutting straw left standing by the header, and means associated with said cutters for depositing the heads and cut straw in separate windrows.

9. In a harvesting machine, a header for removing and collecting the heads of grain, means for removing a portion of the headless straw and carrying it to one side of the cut swath, and means cooperating with the head collecting means to deposit the heads in a swath upon the short stubble left when the portion of the straw is removed.

10. In a harvesting machine, means for removing and collecting the heads from standing grain, means following the first named means for cutting off straw left standing by said first means at a lower elevation than it was cut by the first named means, means for moving said cut straws to one side and depositing it in a windrow, means operating at substantially the height of the stubble left by the second cutting means, said last named means receiving the collected heads and depositing them upon said stubble.

11. In a harvesting machine, a primary cutter unit for cutting off and collecting the heads of standing grain, a secondary cutter unit for cutting a swath through the straw left standing by the primary cutter unit, and an auger associated with said secondary cutting unit for transferring toward one side of the swath the straw cut off by the secondary cutting unit.

12. A structure as defined by claim 13 provided with means for laying down a windrow of heads on a swath of stubble left by the secondary cutting unit.

13. In a harvesting machine, an axle, means for supporting said axle for movement through a grain field, means supported by the axle for removing and collecting heads of grain from straw standing in the field, means connected with said last named means and balancing same for movement about said axle whereby the cutting height of said unit may be adjusted, means for adjusting the cutting height of said head removing means and holding same in an adjusted position, and means for cutting a swath through the straw left standing by the head removing means and removing said cut straw toward one side of the swath.

14. In a harvesting machine, a cutter unit for removing grain heads from standing straw in a field, means at one side of the cutting means for receiving and guiding said heads, conveyor mechanism for receiving the cut heads from the cutter mechanism and delivering same to the guiding mechanism, means below the guiding mechanism and at substantially the height of the straw below the guiding mechanism for receiving the heads and depositing same upon the standing stubble at one side of the cutting mechanism, said guiding means having a bent bottom tending to assist in causing the grain heads to assume positions parallel with the direction of travel of the machine.

15. In a harvesting machine, a cutter unit for removing grain heads from standing straw in a field, means at one side of the cutting means for receiving and guiding said heads, conveyor mechanism for receiving the cut heads from the cutter mechanism and delivering same to the guiding means, means below the guiding means and at substantially the height of the straw below said guiding means for receiving the heads and depositing same upon the standing stubble at one side of said cutting mechanism, and a baffle plate adjustably mounted in guiding means and adjustable therein to assist in causing the grain heads to be deposited on the stubble in positions substantially parallel with the direction of travel of the machine.

16. In a harvesting machine, a cutter unit for removing grain heads from standing straw in a field, means at one side of the cutting means for receiving and guiding said heads, an apron for receiving the cut heads from the cutter mechanism and delivering same to the guiding means, and means below the guiding means and at a substantially constant distance from the ground for receiving the heads and depositing same in a continuous windrow upon stubble left standing at one side of said cutting mechanism and at a substantially constant distance from the ground.

In witness whereof, I hereunto subscribe my name to this specification.

GEORGE INNES.

CERTIFICATE OF CORRECTION.

Patent No. 1,905,410. April 25, 1933.

GEORGE INNES.

It is hereby certified that error appears in the printed specification of the above numbered patent requiring correction as follows: Page 5, line 55, claim 12, for the claim number "13" read "11"; and that the said Letters Patent should be read with this correction therein that the same may conform to the record of the case in the Patent Office.

Signed and sealed this 25th day of July, A. D. 1933.

M. J. Moore.

(Seal) Acting Commissioner of Patents.